THREE-DIMENSIONAL CROSSBAR NETWORK

Filed Sept. 8, 1966 3 Sheets-Sheet 1

INVENTOR.
WILLIAM A. REIMER
BY
Glenn H. Antrim
AGENT 3,387,108
Patented June 4, 1968

3,387,108

THREE-DIMENSIONAL CROSSBAR NETWORK

William A. Reimer, Wheaton, Ill., assignor to Automatic Electric Laboratories, Inc., a corporation of Delaware Filed Sept. 8, 1966, Ser. No. 578,063
9 Claims. (Cl. 200—175)

ABSTRACT OF THE DISCLOSURE

Both stages of a switching network, or grid, are integrated into a two-stage crossbar switch. The switch has three sets of interposed, mutually perpendicular bars corresponding to respective lines, links and trunks. Switch contacts at the intersection of the bars form crosspoints; crosspoints associated with any link include interposed line contacts and trunk contacts as the result of interposition of link bars between perpendicular line and trunk bars which are also interposed. As customary in grids, the number of links is economically limited according to expected peak traffic. The contacts at the crosspoints are self-latching and are operated by simultaneous momentary operation of their respective bars to make a connection; three bars are operated momentarily to operate two crosspoints for completing a two-stage connection, and subsequently only the respective link bar is operated momentarily to restore the crosspoints.

This invention relates to three-dimensional crossbar switches and more particularly to three-dimensional switches having integral common links to effect two-stage network switching.

Commonly, in communication switching networks, or grids, the lines and trunks are arranged in respective groups, and every line in every group has access at different times to every trunk in every group. The number of links for interconnecting the lines and trunks is economically limited to that number necessary to complete immediately a calculated percentage of attempted calls during peak traffic periods. Therefore, although all lines have access to all trunks at times, the number of simultaneous calls from lines in any particular group of lines to any trunk in any particular group of trunks is limited to the number of links that extend between a group of lines and a group of trunks.

Former single-stage, three-dimensional crossbar switches are not directly applicable to two-stage switching. Such a switch of the three-dimensional mechanical type is described in U.S. Patent 2,357,108, issued to R. V. L. Hartley on Aug. 29, 1944. An electronic type of switch can be used for a three-dimensional network is described in U.S. Patent 2,901,547 issued to H. A. Miloche on Aug. 25, 1959. It has two parallel planes of conductors arranged at right angles to each other. According to that patent, connecting links are also perpendicular to both of these perpendicular planes of conductors, and gas tubes connected at crosspoints between the links and the two planes are utilized for completing two-stage connections between selected conductors of each of the two perpendicular planes. The desired connections through two switching points or stages are made by applying relatively high voltage, firing voltage, between the selected conductor of one plane and the selected conductor of the other plane to fire a gas tube at the intersection or crosspoint of a link and each of the planes. The present switch incorporates perpendicular planes of conductors and mechanical switching. The connections are made by selecting and actuating three mutually perpendicular bars.

A network of the usual type integrated into the present three-dimensional switch consists of a plurality of two-dimensional switches with interconnecting conductors or links between those switches for the lines and those switches for the trunks. Each switch has an $x$-coordinate and a $y$-coordinate actuator such that four actuators, two actuators for a line switch and two for a trunk switch, are necessarily operated to complete any connection. The $x$-coordinate actuator and the $y$-coordinate actuator of any selected switch are usually operated sequentially, and "holding current," defined as current flow to one or both the actuators or to a separate holding magnet, is provided for the duration of a call to maintain the switch operated.

An object of the present invention is to provide a switching network in a single three-dimensional crossbar switch.

Another object is to require a minimum amount of operating power by decreasing the number of actuators required to be operated for making a call.

Another object is to further decrease power requirements by elimination of holding current for the duration of a call.

Still another object is to decrease the operating time for closing contacts at a selected crosspoint by operating $x$-coordinate and $y$-coordinate actuators simultaneously.

Briefly in the present invention these objects are attained by a three-dimensional switch having operating bars in each of three coordinate directions. The bars in one direction correspond to lines; the bars in a second direction correspond to trunks; and the bars in the third direction correspond to common links. The lines and the trunks are arranged in groups, and each common link provides access between a group of bars for a group of lines and a group of bars for a group of trunks. A single switch comprises a complete grid for the lines and trunks of a small station. Since each common link is a single bar, only three actuators, rather than four as described above for a conventional grid, are required to connect a selected line to a selected trunk. The selected actuators and corresponding contacts at selected cross-points are operable simultaneously. The switches therefore provide the fast mechanical switching desirable in systems with electronic common control. Upon being operated, the contacts are latched mechanically. Therefore, power requirements are small because no holding current is used and only short simultaneous pulses need to be applied to the three actuators for completing a desired connection.

The invention may be more readily understood with reference to the accompanying drawings in which.

Figures 1, 2:
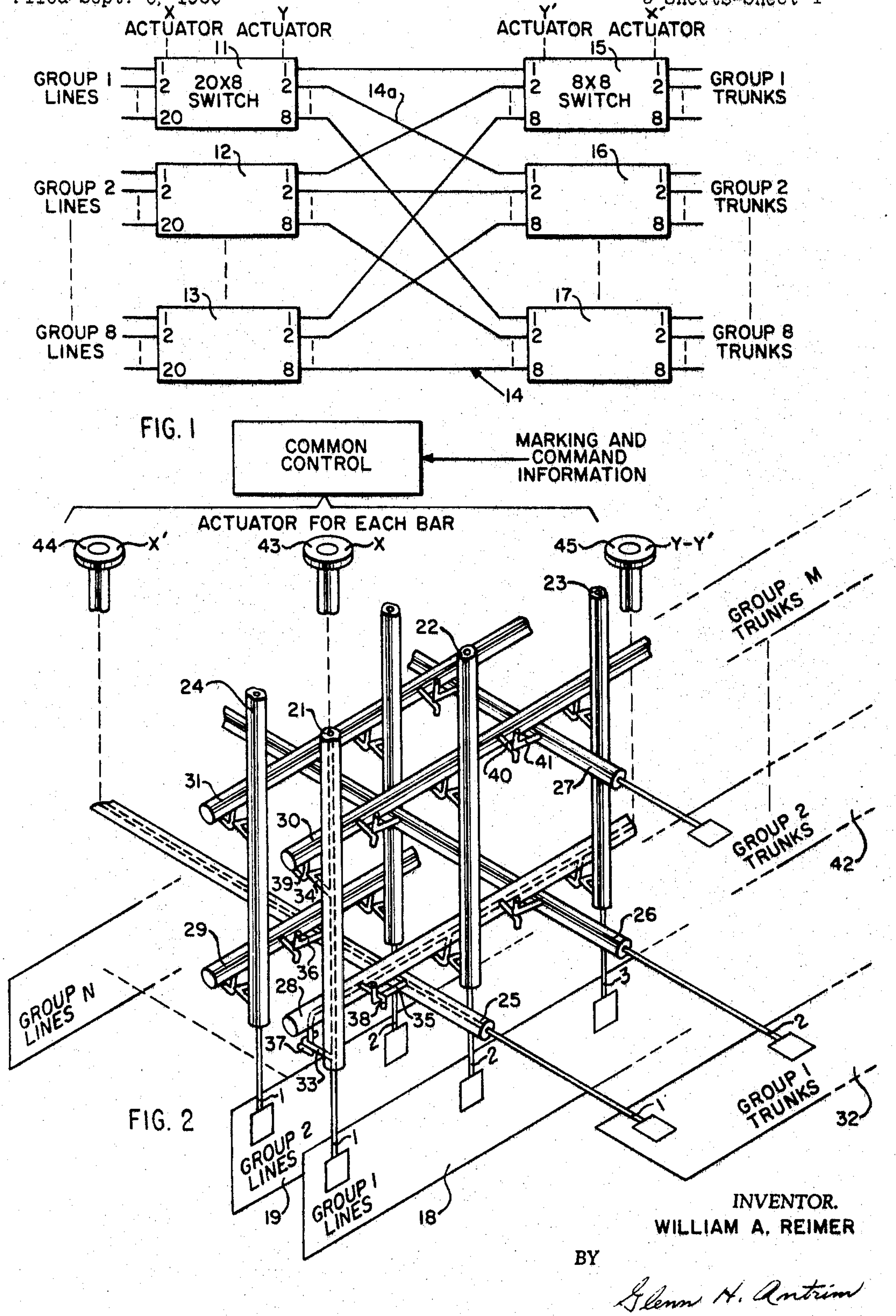
FIG. 1 is a block diagram of a conventional switching grid.
FIG. 2 is a fragmentary, isometric view of the three-dimensional network of this invention.

In detail, a single three-dimensional switch of this invention incorporates the usual switching grid of FIG. 1. In a typical arrangement, one hundred sixty lines arranged in eight groups of twenty lines have access through eight first-stage 20 x 8 switching matrices as represented by crossbar switches 11–13 to sixty-four links 14. Each conductor of a group of eight links 14 is connected to a different terminal of a respective one of the first-stage switches 11–13, and each link of the eight links for any switch 11–13 is connected to a respective terminal of a different one of the eight second-stage switches as represented by the 8 x 8 matrices 15–17. In this manner, each group of lines has access through a single link to any trunk. Summarizing, each of the one hundred sixty lines has access to each of the sixty-four trunks, but any line in a group of twenty lines connected to a respective switch has access to any trunk in a particular group of eight trunks through only a single link. For example, when the line connected to the terminal 2 of the first-stage switch 11 is connected through a link 14*a* to one of the trunks of the second-stage switch 16, any other line of the first-stage line of switch 11 has access to only those trunks of other second-stage switches which are connected to other idle links of the switch 11.

A general arrangement for incorporating the network of FIG. 1 in a three-dimensional switch is illustrated in a fragmentary view of FIG. 2. For simplicity, only a corner portion of a switch is shown, and a multiple conductor circuit required for each line circuit is represented by only a single conductor and a single path through switch contacts.

Groups of lines 18 and 19 correspond to the different groups of lines connected to first-stage switches 11–13 of FIG. 1. Each line has an actuator bar 21–24 for supporting switch conductors for the respective line and for actuating crosspoint switches for that line. These bars are shown with their longitudinal axes arranged vertically and they are arranged in columns, as represented by bars 21–23 in one group lines 18, and in rows, as represented by bars 21 and 24 for different groups 18 and 19 respectively, so that a bar for a different line is positioned at each intersection of these columns and rows.

Actuator bars 25–27 for the trunks are arranged in planes perpendicular to the line bars 21–24, and common-link bars 28–31 are arranged in planes also perpendicular to the line bars and adjacent to those trunk bars to which they are accessible. Each plane of the actuator bars 25–27 has a respective group of trunks corresponding to a group of trunks connected to a second-stage switch 15–17 of FIG. 1. The common-link bars 28–31 extend in the same directions as the columns for groups of lines so that each link, having access to a particular group of trunks, has access to any line of a respective group of lines. For example, the common link 28 has access to the lines of group 18 and also to each of the trunks of the group 32. The common-link bars 28–31 and their interconnected contacts replace the links 14 of FIG. 1, and each common-link bar 28–31 and its associated single actuator 45 ($y$–$y'$) replace both an actuator ($y$) associated with a corresponding link in the first stage switches 11–13 and an actuator ($y'$) associated with the same link in the second stage switches 15–17. The trunk bars 25–27 extend in the same direction as the rows of lines of the different groups, as represented by the groups 18 and 19, in order to have access to a different one of the common links 28–31 for each of the groups 18 and 19.

A pair of contacts for each conductor of a line is located at each crosspoint of the line bars and the common-link bars and also at each crosspoint of the common-link bars and the trunk bars. In FIG. 2, the contacts are shown as spring wires with bent ends that function as hooks. To establish connection, the pair of wires at a selected crosspoint are hooked together. Each line is connected to every spring wire contact on the respective actuator. For example line 1 of the group of lines 18 is connected to contacts 33, 34, and other contacts disposed on the bar 21. Likewise, each trunk is connected to every contact on its respective bar. Trunk 1 of group 32 is connected to contacts 35, 36, and other contacts on the bar 25. The contacts on each common-link bar are connected together so that it can complete a connection from any line of the group with which it is associated to any trunk with which it is associated.

A connection from the line 1 of the group 18 is shown completed through spring contact 33 of the line bar 21, its mating contact 37 of the common-link bar 28, an additional contact 38 at a different point on the common-link bar 28, and the contact 35 of the trunk bar 25 that is connected to trunk 1 of the group 32. In the event that a line other than the line 1 of the group 18 had already engaged the link 28 that has access to the group of trunks 32, the call initiated over line 1 of the group 18 could not have access to any trunk of group 1 but might employ another link that is idle to obtain access to another group of trunks. For example, a connection for the line 1 of the group 18 might be completed through contacts 34 and 39, and contacts 40 and 41 to a trunk in the group of trunks 42. Likewise, the lines of group 19 have access through the link 29 to the group of trunks 32, or through the link 31 to the group of trunks 42.

For a typical network as described above for FIG. 1, twenty bars are in each column for the lines, and eight columns of line bars accommodate eight groups of the lines. A total of sixty-four trunk bars are arranged in eight levels to correspond to eight groups of eight trunks. Sixty-four common-link bars are required so that each group of line bars has a link for each group of trunks.

The actuator bars having spring wire contacts as shown in FIG. 2 can be mounted for rotation over a limited arc. For example, the trunk bar 27 and the link bar 30 are shown in normal positions so that the hooks of the respective spring wires 41 and 40 are separated sufficiently to prevent contact. The selected pair of bars may be operated simultaneously or sequentially in a first direction. As a pair of bars that have mating spring-wire hooks are rotated in a first direction, the hooks pass each other but they are unable to hook together even during simultaneous operation for the direction of rotation of the bars is such that any engagement of the hook is on their closed curved portions, and the hooks slide past each other to a second slightly separate position where the ends of the hooks are directed toward each other. This position is shown in FIG. 4*b* for similar contacts as described below. Upon being released simultaneously, the selected bars are rotated in a second direction and the spring wires at their intersection hook together.

Specifically, assume that actuators 43, 44 and 45 for a line bar 21, a trunk bar 25, and a common-line bar 28 respectively, are operated in their first directions preliminary to making the connection that was traced above. The actuators are then released simultaneously and return springs (not shown in FIG. 2) rotate the bars in their opposite directions in synchronism such that the hooked portions of the pair of spring wires 33 and 37 and the pair of spring wires 35 and 38 engage. The return springs return the bars 21, 25, and 28 to their normal positions while the respective spring wires are flexed as the hooks 33, 37 and 35, 38 are retained in intermediate positions. The spring force between the contacts ensures good, constant contact. Obviously, no current is now required to maintain the connection from the line 1 of group 18 to the trunk 1 of the group 32. Operated spring-wire contacts are released by momentary operation of the associated common-link bar. In this example, the actuator 45 is momentarily operated to open the contacts 33, 37 and 35, 38.

Figure 3:
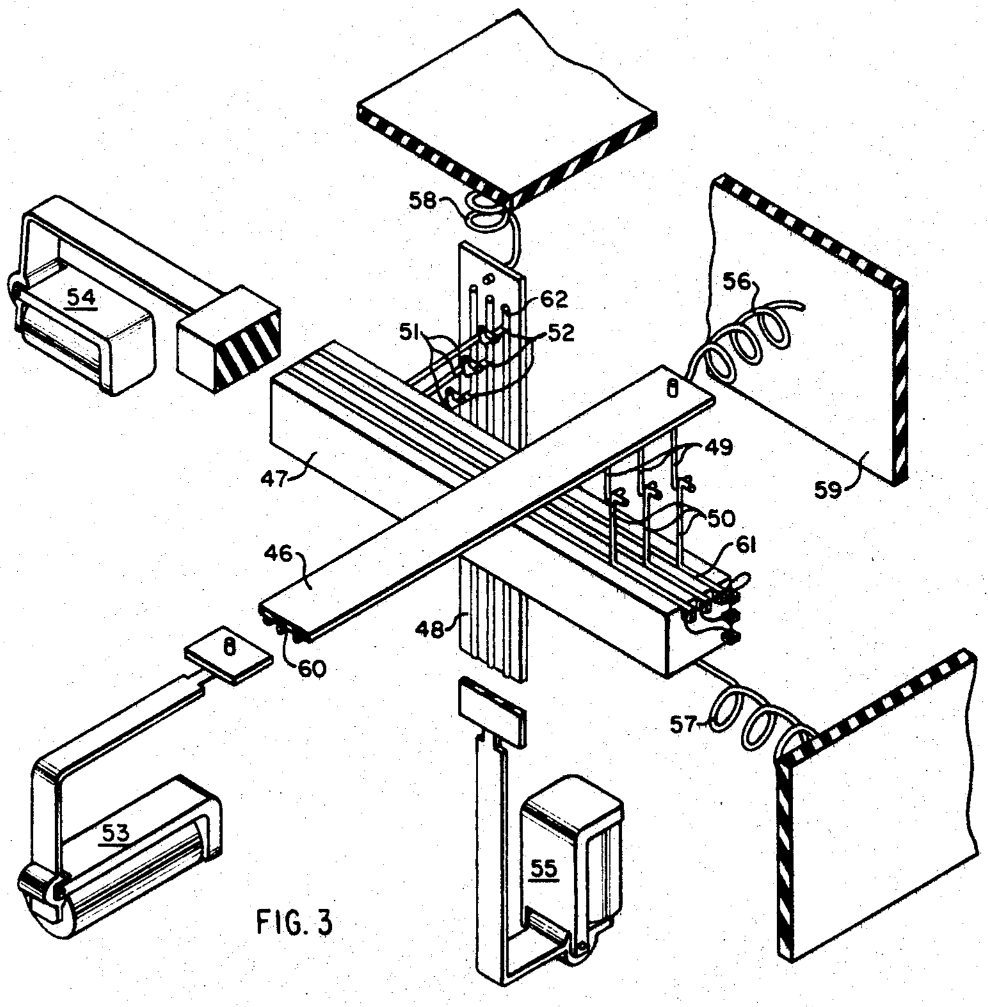
FIG. 3 is an isometric view of a three-conductor, two-stage, crosspoint contact arrangement for implementing the network of FIG. 1.

A three-conductor, hook-and-latch arrangement of contacts is shown in FIG. 3. A line bar 46, a link bar 47, and a trunk bar 48 are oriented in respective three-dimensional coordinate directions. A first-stage crosspoint comprises three spring wire contacts 49 each being similar to those shown in FIG. 1, mounted on that surface of the line bar 46 which faces the link bar 47, and likewise three mating spring wire contacts 50 mounted on that surface of the link bar 47 which faces the line bar. The spring wires extend outwardly between the bars such that the paths of the hooks of the spring wires on one bar intersect the paths of the hooks of respective spring wires of the other bar as the bars are moved reciprocally a short distance to cause the pairs of spring wires to pass, or tend to pass, one another. Likewise, three pairs of spring wires comprising spring wires 51 extending from the common link bar 47 and spring wires 52 extending from the trunk bar 48, are a second-stage crosspoint.

The bars 46, 47, and 48 are mounted for longitudinal movement over a limited distance sufficient to engage and disengage the springs wires 49–52. A tension spring 56, 57, or 58 is connected between one end of each bar and an adjacent portion of the frame 59 to position each bar at one end of its travel toward that portion of the frame.

The opposite ends of the bars 46, 47, and 48 are connected to magnetic actuators 53, 54, and 55 respectively. Each actuator is operable to move its bar against the force of its tension spring 56, 57 or 58 to the opposite end of the travel of the bar.

Figure 4A:
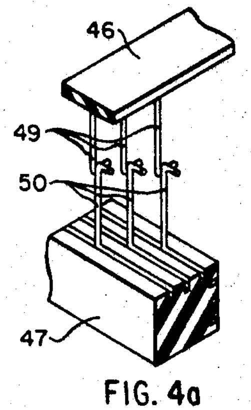
FIGS. 4a–4c show multiple contacts of FIG. 3 is a sequence of operations.
Figure 4B:
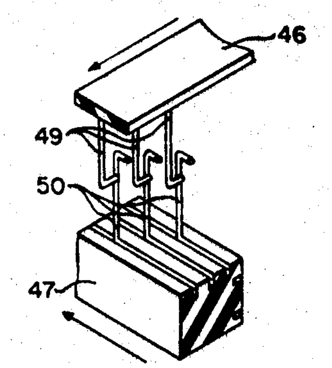
Figure 4C:
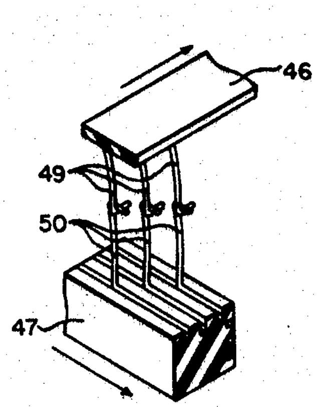

The contacts 49 and 50 of FIG. 4*a* are shown in their normal, open positions when the actuators 53 and 54 are released. When the actuators are operating, the spring wires or contacts 49 pass the contacts 50 and are again separated, but they are in opposite directions from each other as shown in FIG. 4*b*. Even though the contacts touch while passing, they will not hook for they are moving in the direction of the blunt portion of their hooks. The actuators 53 and 54 are then released simultaneously so that the open portions of the hooks of the spring wires 49 and 50 engage and latch as shown in FIG. 4*c*. The bars 46 and 47 return to their normal positions, and the tension of the spring wires 49 and 50 maintain sufficient force between the hooks of the engaged spring wires 49 and 50 to ensure good electrical contact. Only one of the magnets needs to be reoperated momentarily to break the contacts and return the spring wires 49 and 50 to their positions as shown in FIG. 4*a*.

Summarizing, in a switch having contacts like those shown in FIG. 3, each line has an actuator 53 and a line bar 46, and each trunk has an actuator 55 and a trunk bar 48. Each bar has a plurality of conductors 60–62 connected to a required number of sets of spring wire contacts like contacts 49. The common link bar 47 has a plurality of sets of contacts 50 extending to different line bars of different groups, and a plurality of sets of contacts 51 orthogonal thereto extending to different trunk bars within the same group. All contacts for any bar are electrically connected together. Preferably, the switch as illustrated in FIG. 3, is operated in response to simultaneous pulses to the actuators for a selected line, for a selected trunk, and for an accessible link interconnecting the line and trunk. When the three actuators are released simultaneously, the contacts or spring wires 49 and 50 between the selected line and the link, and the spring wires 51 and 52 between the link and the selected trunk, hook together to complete a connection between the line conductors 60, through link conductors 61 to trunk conductors 62. When the connection is no longer required, the actuator 54 alone may receive a pulse from the common control to operate the link bar 47 momentarily for breaking the contacts 49 and 50 and contacts 51 and 52 of the first and second stages for the line and trunk respectively.

Figures 5, 6:
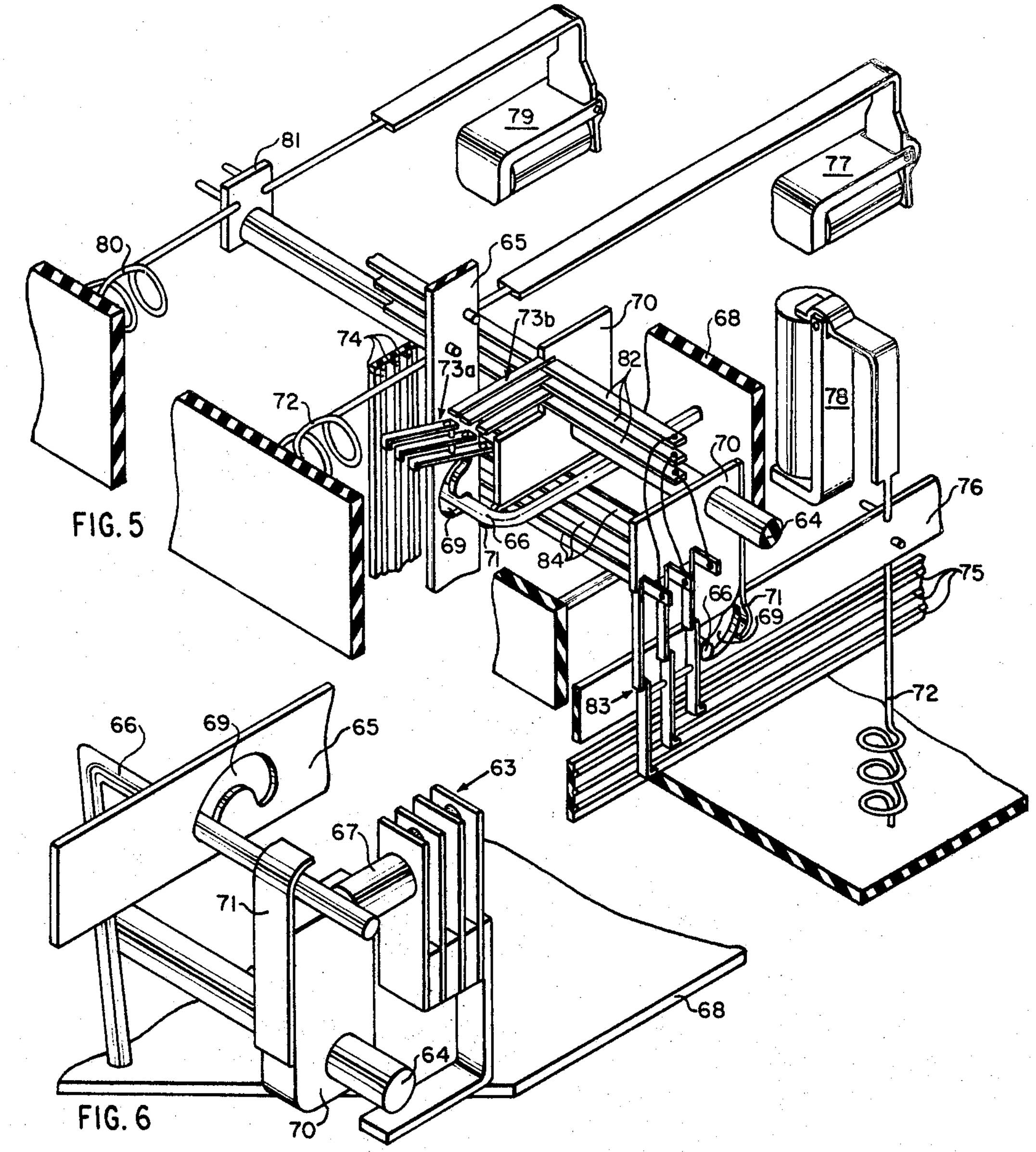
FIG. 5 is an isometric view of another embodiment of a three-conductor, crosspoint contact arrangement for implementing the network of FIG. 1.
FIG. 6 shows in detail a suitable arrangement of the contacts of the embodiment of FIG. 5.

Another first- and second-stage crosspoint arrangement that also features simultaneous operation of actuators and mechanical latching is illustrated in FIG. 5. The construction of a single crosspoint switch is shown in FIG. 6. A stack of leaf spring contacts 63 is operated by positioning a rod or pin 66 to press against an insulating bushing 67 attached to the spring contacts. In order to move the pin from its normal position to its position for operating the contacts 63, a rotary select bar 64 and a locking select bar 65 are operated simultaneously.

In detail according to FIGS. 5 and 6, a spring rod 66 extends from a frame member 68 perpendicularly through an arcuate opening 69 of the bar 65 to a position opposite the leaf spring contacts 63 of FIG. 6 or contacts **73*a*–73*b* of FIG. 5. The spring rod 66 is strained so that it has a component of force in the direction of the radius of the arcuate opening 69 and a component of force in the direction along the arcuate opening 69 toward that end in which it is normally located. A resilient portion 71 of an arm 70 has a curved end portion bearing against the rod 66 at a point adjacent the bar 65 and the spring contacts 63. The arm 70 is secured to the rotary bar 64, and the bar is parallel to the pin 66 so that rotation of the bar 64 and its arm 70 in one direction causes an increased lateral force toward the contacts 63 by the resilient portion 71 against the rod 66**.

Figure 7A:
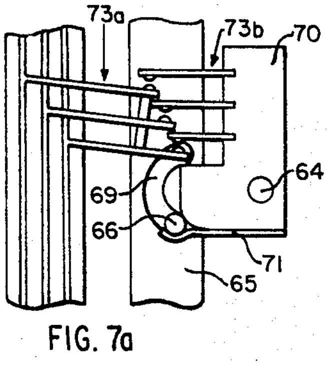
FIGS. 7a–7c show a sequence of operation of the contacts of FIG. 5.

The rotary bar 64 and the locking bar 65 are shown in their normal positions in FIG. 7*a*. The arcuate opening 69 is oriented such that its chord is in the longitudinal direction of the bar 65. The rod or pin 66 is located in that end of the arcuate opening away from the spring contacts **73*a*–73*b* that are normally open. The bar 65 is being urged in the direction away from the arm 70 by springs 72 as shown in FIG. 5. The inherent tension of the spring rod 66 retains the rod at the end of the arcuate opening 69**.

As the bar 65 alone is moved laterally and the arm 70 remains stationary when another crosspoint along the bar 65 is to be operated, the bar 65 moves in the direction toward the arm 70 and the pin 66 moves along the opening. However, since the resilient portion 71 is not rotated to urge the pin along the curve, it does not reach the center of the opening. As the other selected crosspoint is operated and the bar 65 is returned to its normal position, the pin 66 returns to its normal position in the end of the opening. As described above, the spring rod 66 is tensioned for urging it inward along the radius of the arcuate opening 69. The pin 66 may be mounted in other ways and return force applied by other well known means.

The contacts **73*a*–73*b* also remain open when the rotatable bar 64 is rotated, but the locking bar 65 remains stationary when another crosspoint along the rotatable bar 64 is to be operated. Since the arcuate path that the pin 66 is urged to follow by the rotation of the arm 70 has a longer radius than the radius of the arcuate opening 69, the edge about the opening retains the pin in its normal position while the resilient portion 71 flexes to permit rotation of the bar 64**.

Figure 7B:
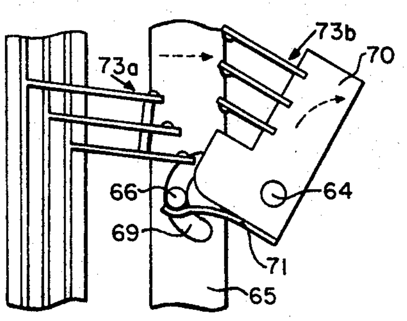
Figure 7C:
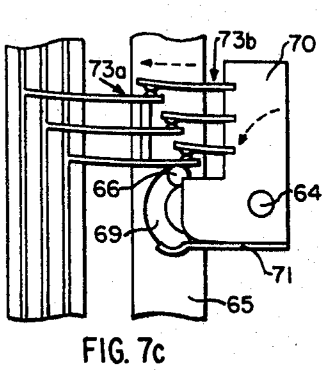

The simultaneous operation of both the rotary select bar 64 and the locking bar 65 closes the contacts **73*a*–73*b*** according to the sequence shown in FIGS. 7*b* and 7*c*. Lateral movement of the bar 65 toward the lever 70 allows the pin 66 to travel in the arcuate opening 69 as it is urged by the resilient arm 71 to follow a circumferential path about the rotary bar 64. The arm 71 urges the pin past a center position (FIG. 7*b*) within the arcuate opening 69, and while the bar 65 is being returned to its normal position by its return springs 72 (FIG. 5), the edge of the opening 69 functions as a cam to move the pin 66 to that end of the opening adjacent the spring contacts **73*a*. As the pin approaches the end of its travel, it presses against the pile of springs 73*a*** to move them to an operated position. According to the embodiment shown in FIGS. 7*a*–7*c*, the mating contacts **73*b* extend from the rotary arm 70 so that the pin 66 must be in its operate position, and the arm 70 attached to the rotary bar 64 must be returned to its normal position before the contacts 73 are closed. To open the contacts 73, the bar 65** is operated momentarily, and the return force that is continually exerted on the pin moves it to its normal position.

Two crosspoints shown in FIG. 5 for first- and second-stage switching operate according to the sequence shown in FIGS. 7a–7c. A rotatable bar 64 for a common link and the locking bars 65 and 76 for lines and trunks respectively are operated simultaneously to connect line conductors 74 to trunk conductors 75. In order to move the locking bars laterally, a spaced pair of actuators is coupled to each bar. An actuator 77 of a pair is shown connected to the bar 65, and an actuator 78 is shown connected to the bar 76. A pair of tension springs 72 opposite corresponding actuators urge the bars 65 and 76 toward their normal positions. An operating lever is secured to the rotatable bar 64. A spring 80 is attached between the lever and the frame of the switch for maintaining the bar 64 in a normal position, and an actuator 79 is coupled to the lever 81 for rotating the bar in opposition to the spring tension to an operate position.

As described above with reference to FIGS. 7b and 7c, simultaneous operation of the actuators 77 and 79 for operating the bars 65 and 64 respectively closes the contacts 73a–73b for connecting the line conductor 74 to common-link conductors 82; and in addition simultaneous operation of the actuator 78 closes the contacts 83 for connecting the common-link conductors 84 to trunk conductors 75. The common-link conductors 82 and 84 are interconnected. A line circuit can be traced from the conductors 74, through contacts 73a–73b, common-link conductors 82 and 84, contacts 83, to the trunk conductors 75. When a disconnect signal is transmitted from a common control circuit (not shown) to the switch as represented in FIG. 5, the actuator 79 is momentarily reoperated to open the switch contacts 73a–73b and 83.

The crossbar arrangements described herein are readily adapted to memory systems as well as to networks. When used as memories, different sets of contacts along a particular bar are connected to different conductors, and in operation, a plurality of actuators that have been accessible to a single bar for a "word" are operated simultaneously so that any selected number of crosspoints along a single bar may be operated together.

Although the three-dimensional network switch of this invention has been described with reference to particular embodiments which show different crosspoint arrangements, the switch may be changed in ways obivous to those skilled in the art without departing from the true spirit and scope of the invention.

What is claimed is:

1. In a three-dimensional network switch, a plurality of parallel first conductors within said switch for first lines, a plurality of parallel second conductors for second lines, each of said lines having a required number of said conductors, said conductors for each of said lines being spaced apart from said conductors for other of said lines, said first conductors for different ones of said first lines being transversely interposed with said second conductors for a different ones of said second lines, a plurality of links, each link having the required number of conductors for interconnecting a selected one of said first lines to a selected one of said second lines, said links being interposed transverse both said first conductors and said second conductors to form different crosspoints for first lines and said second lines respectively, each of said links having crosspoints for a respective group of said first lines and interposed crosspoints for a respective group of said second lines, a pair of normally open switching contacts at each crosspoint connected between each conductor of said link and a corresponding conductor of the adjacent one of said transverse lines, first operating means connected to said crosspoints associated with said first lines, said first operating means being operable selectively to control at one time said crosspoints for a particular one of said first lines, second operating means connected to said crosspoints associated with said second lines, said second operating means being operable selectively to control at one time said crosspoints for a particular one of said second lines, third operating means connected to said crosspoints associated with said links, said third operating means being operable selectively to control at one time said crosspoints for a particular one of said links, said switching contacts which are connected between said conductors of a selected one of said first lines and said conductors of a selected adjacent idle one of said links being latched in a closed position in response to momentary coincidental operation of said first and third operating means, said switching contacts connected between said conductors of said selected link and said conductors of a selected one of said second lines adjacent said selected link being latched in a closed position in response to momentary coincidental operation of said second and third operating means.

2. In network switch according to claim 1 in which said switching contacts are self-latching in closed positions and said third operating means is subsequently operable momentarily to select and to open any desired ones of said closed contacts connected to said selected link.

3. In a network switch according to claim 5 in which said first, second, and third operating means include a first, a second, and a third operating bar for each of said first lines, said second lines, and said links respectively, said conductors for each of said lines and each of said links being carried by their respective bar, each pair of said contacts comprising a pair of wire springs, one spring of each pair extending from a respective one of said third bars and being connected to a respective one of said third conductors, and the other of each of said pairs extending from one of said line bars and connected to a respective conductor, each of said wire springs having a bent portion for a hook at the free end thereof, operation of any of said means causing its hooks for a selected one of said bars to move reciprocally over a predetermined distance, the paths of the hooks for any of said pair of contacts intersecting, and said pairs of hooks common to two of said selected bars engaging for closing said contacts.

4. In a network switch according to claim 3 in which said third operating means is subsequently operable momentarily to reciprocally move a selected one of said operated third bars to open said previously selected pairs of wire springs connected to said third conductors of said selected third bar.

5. In a network switch according to claim 1 in which said first and second operating means includes a first and a second operating bar for each of said first and second lines respectively, said bars being mounted for limited lateral translation in response to operation of said respective operating means, each of said bars having an arcuate slot adjacent each of said crosspoints for its respective line, said slots being oriented so that the bisectors of said slots of any said bars is in the direction of the lateral movement of the respective bar, a pin extending through each of said slots, each of said pins normally being urged from the center of its slot to a normal position at one end thereof, said switching contacts at each of said crosspoints being operated in response to said respective pin at its crosspoint being operated to that end of its slot opposite its normal position, said third operating means including resilient means for each of said crosspoints operable to engage said respective pin and to urge said pin in the direction away from its normal position to its operate position so that said pair for any selected crosspoint travels through the arc of its slot to its operate position in response to simultaneous operation of said respective operating means for closing said contacts of that selected crosspoint, and said selected pins being retained in their operate positions by their respective slots until said respective first and second bars are moved laterally by reoperation of said respective operating means.

6. In a switching network of the type having a plurality of line terminals, a plurality of trunk terminals, said line terminals, and said trunk terminals being arranged in line groups and trunk groups respectively, a plurality of switching links for selectively connecting any of said line terminals to any of said trunk terminals, said trunk terminals in each of said trunk groups being accessible through only certain ones of said links for connection to said line terminals in certain of said line groups, a three-dimensional network switch and control circuits therefor comprising:

a line bar, a link bar, and a trunk bar for each of said line terminals, said switching links, and said trunk terminals respectively, each of said bars being mounted on its longitudinal axis for reciprocal movement through a predetermined distance, the direction of the axes of said line bars, said link bars, and said trunk bars being oriented in respective orthogonal three-dimensional coordinate directions, a plurality of pairs of line switching contacts for each of said line bars, a plurality of pairs of trunk switching contacts for each of said trunk bars, one contact of each of said pairs being controlled by operation of its respective bar, said one contacts of each bar being interconnected and connected to a respective one of said terminals of said network, the other contact of each of said pairs being controlled by operation of certain ones of said link bars, each of said link bars controlling said other contacts for both certain accessible ones of said line bars and certain accessible ones of said trunk bars, said other contacts of any one of said link bars being interconnected, common control means connected to said bars, said common control means being operable to move simultaneously and momentarily through said predetermined distance a selected one of said line bars, a selected one of said trunk bars, and any one of said link bars that control certain ones of said other interconnected contacts of said pairs of both said selected line bar and said selected trunk bar, and said pair of contacts common with said selected link bar and said selected line bar and said pair of contacts common with said selected link bar and said trunk bars being closed in response to operation of said selected bars to complete a link circuit from said line terminal corresponding to said selected line bar and said trunk terminal corresponding to said selected trunk bar, and said common control means being reoperable to move momentarily said selected link bar to reopen said closed contacts.

7. In a switching network of the type having a plurality of line terminals, a plurality of trunk terminals, said line terminals, and said trunk terminals being arranged in line groups and trunk groups respectively, a plurality of switching links for selectively connecting any of said line terminals to any of said trunk terminals, said trunk terminals in each of said trunk groups being accessible through only certain ones of said links for connection to said line terminals in certain of said line groups, a three-dimensional network switch and control circuits therefor comprising:

a plurality of pairs of line switching contacts for each of said line terminals and a plurality of pairs of trunk switching contacts for each of said trunk terminals, one contact of each of said pairs being connected to said respective terminal, said pairs of trunk contacts arranged in a three-dimensional array of rows and columns and interposed with said pairs of line contacts also arranged in a three-dimensional array, said line switching contacts for any one of said line terminals being arranged in a particular row and said trunk switching contacts for any one of said trunk terminals being arranged in a particular column, first operating means having a first operating member for each of said lines in an operative connection with all of said pairs of contacts for the respective line, second operating means having a second operating member for each of said trunks in an operative connection with all of said pairs of contacts for the respective trunk, third operating means having third operating members interposed between said first and second operating members so that each of said third operating members are adjacent one of said pairs of line contacts for each different one of said line terminals within a respective one of said line groups and also adjacent one of said pairs of trunk contacts for each different one of said trunk terminals within a respective one of said trunk groups, said third operating members having operative connection with said adjacent contacts, said other contacts of said pairs adjacent each of said third operating members being interconnected to form one of said links, said first, second, and third operating means being operated simultaneously for operating a selected one of said first operating members, a selected one of said second operating members, and a selected one of said third operating members respectively, said selected third operating member being adjacent the group of line terminals and the group of trunk terminals having operative connections with said selected first and second operating members, the particular one of said pair of line contacts that is operatively connected to both said selected first operating member and said selected third operating member being closed in response to said simultaneous operation thereof, and said pair of trunk contacts that is operatively connected to both said selected second operating member and said third selected operating member being closed in response to their operation to complete one of said links between said line and trunk terminals corresponding to said first and third selected operating members respectively.

8. A three-dimensional crossbar network comprising:

a plurality of first, second, and third groups arranged in corresponding groups, all bars of each of said groups being mounted parallel on longitudinal axes and oriented in a respective one of three-dimensional coordinate directions, each bar being operative for transferring motion through a predetermined distance, a plurality of pairs of switching contacts for each of said bars, each of said contacts extending outwardly from a respective one of said bars to be positioned by operation thereof, the free end of said contacts having a bent portion as a hook, one contact of each of said pairs being positioned by said second bars, the other contacts of certain of said pairs being positioned by said first bars and the other contacts of the remaining ones of said pairs being positioned by said third bars, said bars of each group being arranged in parallel planes and the parallel bars of the different groups being interposed and spaced apart as required to facilitate opening and closing of said pairs of contacts by disengaging and engaging said hooks in response to operation of said bars, each of said bars being operable to move said hooks over a predetermined distance, the relative positioning of said bars being such that the paths of said hooks of said second bars intersect the paths of those hooks of said first and third bars according to respective pairs at about midpoint of the travel of the hooks as the bars are operated, spring means connected to said bars to urge each of said bars of each of said groups in one direction to a normal position at one end of its travel, a common control means connected to said bars, said common control means being operable to move through said predetermined distance against the force of said spring means any selected bar of said first group, any selected bar of said third group, and a bar of said second group, said latter bar being one of those interposed between said selected bars of said first and third groups, said common control means being effective to release said three operated bars simultaneously so that said spring means moves them in unison to effect engagement of said hooks of the pair of said contacts that extend between said selected second bar and said selected first bar and the pair of said contacts that extend between said selected second bar and said selected third bar, said contacts of said second bars being interconnected for completing a link between contacts of any selected one of said first bars and contacts of any selected one of said third bars, and said engaged contacts of said selected bars being disengaged in response to subsequent operation of said common control means to move said selected second bar against the force of said spring means.

9. A three-dimensional two-stage crossbar switch comprising:

a plurality of line crossbar contacts arranged in columns and rows in a plurality of parallel first planes, a plurality of trunk crossbar contacts arranged in columns and rows in a plurality of parallel second planes, said second planes transversing said first planes such that said contacts within each of said rows of said trunk contacts are interposed with said contacts of a particular row of said line contacts, a plurality of line conductors, each of said conductors interconnecting said contacts in a particular column of said line contacts, a plurality of trunk conductors, each of said trunk conductors interconnecting said contacts in a particular column of said trunk contacts, a plurality of links, each of said links having a plurality of interconnected link contacts, each of said contacts in any particular one of said links being disposed in a mating relation with a different one of said contacts in a particular row of said interposed line and trunk contacts, first actuator means connected to said line contacts, second actuator means connected to said link contacts, and third actuator means connected to said trunk contacts, said first actuator means being operable selectively to actuate at one time all of said line contacts in any selected one of said columns of line contacts, said second actuator means being operable selectively to actuate at one time all of said link contacts connected to any selected one of said links, said third actuator means being operable selectively to actuate at one time all of trunk contacts in any selected one of said columns of trunk contacts, any particular one of said crosspoints being operated to a closed condition in response to conjoint operation of two of said actuator means which actuate its contacts, an electrical connection between any particular one of said line conductors and any particular one of said trunk conductors being completed by one of said links through two of its crosspoints which have contacts common to both said particular line conductor and said particular trunk conductor in response to conjoint operation of said first actuator for actuating the contacts of said particular line conductor, of said third actuator for actuating the contacts of said particular trunk conductor, and of said second actuator for actuating contacts of said link having said common contacts.

References Cited

UNITED STATES PATENTS

| | | | |
|---|---|---|---|
| 1,293,494 | 2/1919 | McQuarrie | 335—112 |
| 2,901,547 | 8/1959 | Miloche | 200—175 |
| 3,233,050 | 2/1966 | McKee | 200—1 |

BERNARD A. GILHEANY, *Primary Examiner.*

H. BROOME, *Assistant Examiner.*